US008826254B2

(12) United States Patent
Gounares et al.

(10) Patent No.: US 8,826,254 B2
(45) Date of Patent: Sep. 2, 2014

(54) MEMOIZING WITH READ ONLY SIDE EFFECTS

(71) Applicant: Concurix Corporation, Kirkland, WA (US)

(72) Inventors: Alexadner G. Gounares, Kirkland, WA (US); Ying Li, Bellevue, WA (US); Charles D. Garrett, Woodinville, WA (US); Michael D. Noakes, Burien, WA (US)

(73) Assignee: Concurix Corporation, Kirkland, WA (US)

( * ) Notice: Subject to any disclaimer, the term of this patent is extended or adjusted under 35 U.S.C. 154(b) by 0 days.

(21) Appl. No.: 13/671,825

(22) Filed: Nov. 8, 2012

(65) Prior Publication Data
US 2013/0074056 A1 Mar. 21, 2013

(51) Int. Cl.
*G06F 9/44* (2006.01)
*G06F 9/45* (2006.01)

(52) U.S. Cl.
CPC .................................. *G06F 8/4441* (2013.01)
USPC ........................... 717/151; 717/152; 717/158

(58) Field of Classification Search
None
See application file for complete search history.

(56) References Cited

U.S. PATENT DOCUMENTS

| | | | | |
|---|---|---|---|---|
| 4,509,132 A * | 4/1985 | Kavaya | ......................... | 702/109 |
| 5,812,780 A * | 9/1998 | Chen et al. | ..................... | 709/224 |
| 6,434,613 B1 * | 8/2002 | Bertram et al. | ................ | 709/223 |
| 6,934,934 B1 * | 8/2005 | Osborne et al. | ................ | 717/126 |
| 7,000,224 B1 * | 2/2006 | Osborne et al. | ................ | 717/125 |
| 7,577,951 B2 * | 8/2009 | Partamian et al. | ................. | 718/1 |
| 8,099,726 B2 * | 1/2012 | Harris | ........................... | 717/152 |
| 8,108,848 B2 * | 1/2012 | Meijer et al. | ................... | 717/151 |
| 8,312,439 B2 * | 11/2012 | Kielstra et al. | ................. | 717/151 |
| 8,418,160 B2 * | 4/2013 | Doyle | ........................... | 717/151 |
| 8,752,021 B2 * | 6/2014 | Li et al. | .......................... | 717/151 |
| 2002/0108106 A1 * | 8/2002 | Kramskoy et al. | ............. | 717/158 |
| 2002/0112227 A1 * | 8/2002 | Kramskoy et al. | ............. | 717/148 |
| 2002/0133757 A1 * | 9/2002 | Bertram et al. | .................. | 714/47 |
| 2003/0167462 A1 * | 9/2003 | Harrison et al. | ............... | 717/158 |
| 2004/0154012 A1 * | 8/2004 | Wang et al. | ..................... | 717/158 |
| 2006/0150160 A1 * | 7/2006 | Taft et al. | ....................... | 717/126 |
| 2006/0230384 A1 * | 10/2006 | Potts et al. | ..................... | 717/124 |
| 2008/0115116 A1 | 5/2008 | Francis et al. | | |
| 2008/0134158 A1 * | 6/2008 | Salz et al. | ....................... | 717/148 |
| 2008/0155074 A1 * | 6/2008 | Bacinschi | ....................... | 709/222 |
| 2009/0049421 A1 | 2/2009 | Meijer et al. | | |

(Continued)

OTHER PUBLICATIONS

Salcianu, Rinard, "Purity and Side Effect analysis for Java Programs"; 2005, Springer; [retrieved on Nov. 21, 2013]; Retrieved from Internet <URL:http://link.springer.com/chapter/10.1007/978-3-540-30579-8_14>;pp. 199-215.*

(Continued)

*Primary Examiner* — Xi D Chen
(74) *Attorney, Agent, or Firm* — Russell S. Krajec

(57) ABSTRACT

A function may be memoized when a side effect is a read only side effect. Provided that the read only side effect does not mutate a memory object, the side effect may be considered as an input to a function for purity and memoization analysis. When a read only side effect may be encountered during memoization analysis, the read only side effect may be treated as an input to a function for memoization analysis. In some cases, such side effects may enable an impure function to behave as a pure function for the purposes of memoization.

19 Claims, 16 Drawing Sheets

(56) References Cited

U.S. PATENT DOCUMENTS

| | | | |
|---|---|---|---|
| 2009/0089771 A1* | 4/2009 | Gill et al. | 717/158 |
| 2010/0306754 A1* | 12/2010 | Javed et al. | 717/152 |
| 2012/0089962 A1* | 4/2012 | Centonze et al. | 717/152 |
| 2012/0096448 A1 | 4/2012 | Doyle | |
| 2013/0067445 A1* | 3/2013 | Gounares et al. | 717/152 |
| 2013/0074057 A1* | 3/2013 | Gounares et al. | 717/152 |

OTHER PUBLICATIONS

Pickett, Verrugge, "Return Value Prediction in a Java Virtual Machine"; Preceedings of the Second Value-Prediction and value-Based Optimization Workshop, 2004; [retrieved on Mar. 6, 2014]; Retrieved from Internet <URL: http://www.sable.mcgill.ca/~cpicke/papers/pickett-04-return.pdf>;pp. 1-8.*

Saraiva, et al., "Functional Incremental Attribute Evaluation", 2000 Springer-Verlag; [retrieved on Jul. 7, 2014]; Retrieved from Internet <URL:http://link.springer.com/chapter/10.1007/3-540-46423-9_19#page-1>;pp. 279-294.*

Sodani, Sohi, "An Empirical Analysis of Instruction Repectition", 1998 ACM; [retrieved on Jul. 7, 2014]; Retrieved from Internet <URL:http:/dl.acm.org/citation.cfm?id=291016>;pp. 35-45.*

Kameyama, et al., "Shifting the Stage—Staging with Delimited Control", 2009 ACM; [retrieved on Jul. 7, 2014]; Retrieved from Internet <URL:http:/dl.acm.org/citation.cfm?id=1480945>;pp. 111-120.*

Huang, et al., "Relm & RelmInfer: Checking and Inference of Reference Immutability and Method Purity"; [retrieved on Jul. 7, 2014]; Retrieved from Internet <URL:http:/dl.acm.org/citation.cfm?id=2384616>;pp. 879-896.*

Frost, Richard, "Monadic Memoization towards Correctness-Preserving Reduction of Search", In: Proceedings of 16th the Canadian Society of Intelligence Conference on Advances in Artificial Intelligence, pp. 66-80, Jun. 11-13, 2003.

International Searching Authority, International Search Report and Written Opinion, Korean Intellectual Property Office, PCT/US2013/041128, Aug. 21, 2013.

Mostow, Jack, et al., "Automated Program Speedup by Deciding What to Cache", In: Proceedings of the 9th International Joint Conference on Artificial Intelligence, vol. 1, pp. 165-172m 1985.

Rito Hugo, et al., "Memoization of Methods Using Software Transactional Memory to Track Internal State Dependencies", In: Proceedings of the 8th International Conference on the Principles and Practice of Programming in Java, pp. 89-98, Sep. 15-17, 2010.

* cited by examiner

MEMOIZING WITH READ ONLY SIDE EFFECTS

BACKGROUND

Memoization is an optimization technique for speeding up computer programs by caching the results of a function call. Memoization avoids having a function calculate the results when the results may be already stored in cache. In cases where the function call may be computationally expensive, memoization may drastically reduce computation time by only performing a specific calculation one time.

Memoization may add overhead to a program. The overhead may include testing a cache prior to executing a function, plus the overhead of storing results.

Memoization is possible when functions are 'pure'. A pure function is one in which the function returns a consistent result given a set of inputs and is free from side effects. Side effects may be any change of state or other interaction with calling functions or the outside world.

SUMMARY

A function may be memoized when a side effect is a read only side effect. Provided that the read only side effect does not mutate a memory object, the side effect may be considered as an input to a function for purity and memoization analysis. When a read only side effect may be encountered during memoization analysis, the read only side effect may be treated as an input to a function for memoization analysis. In some cases, such side effects may enable an impure function to behave as a pure function for the purposes of memoization.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
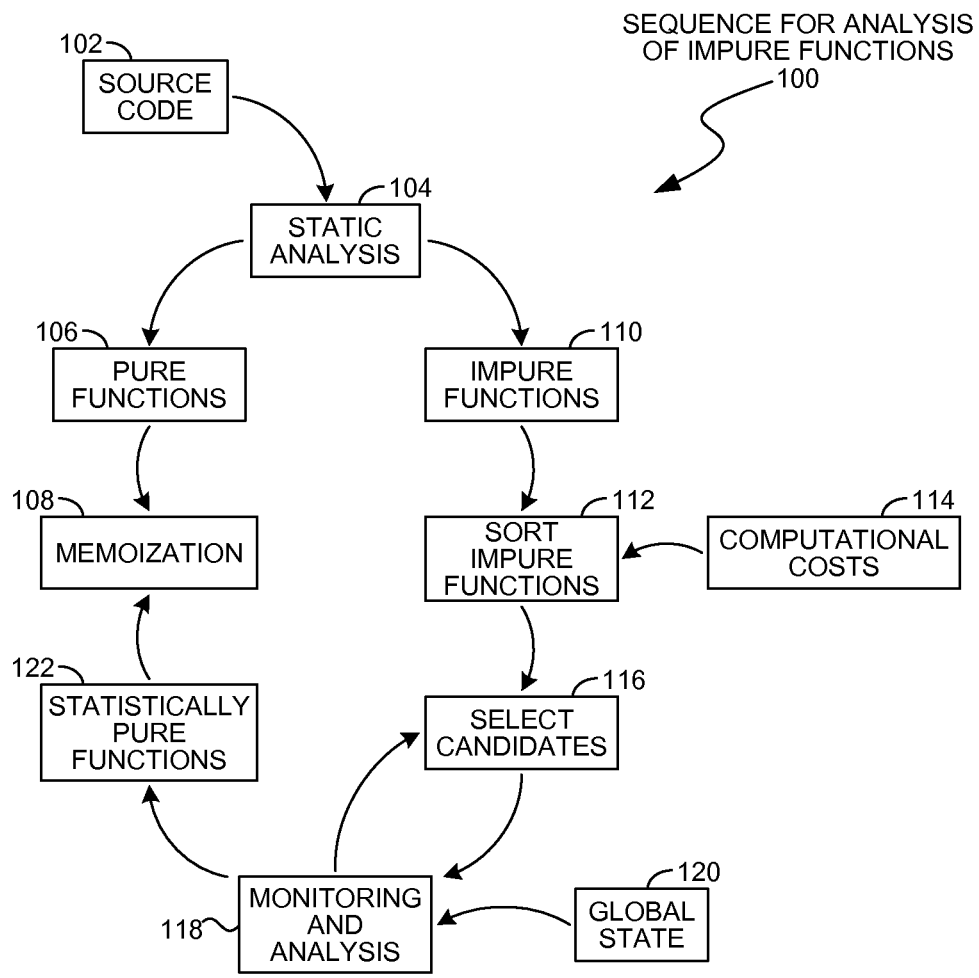
FIG. 1 is a diagram illustration of an embodiment showing a sequence for analysis of impure code.

A purity analysis of a function may gather observations of the execution of the function, then analyze the observations to determine when and if the function behaves as a pure function. When the function is classified as a pure function, the function may be memoized.

After analyzing several different sets of input parameters which may be treated as input vectors, clustering may be performed to create areas of known input vectors for which memoization may be performed and areas of known input vectors for which memoization may not be performed. The areas may be defined by clustering analysis performed within the n-dimensional space defined by the input vectors. The clustering analysis may create confidence boundaries within the input space.

The confidence boundaries may be used to estimate whether an input vector may be memoized. When a new input vector lands within a confidence boundary, the input vector may be treated as a memoizable or not memoizable function without performing a memoization analysis on the input vector.

The purity analysis may use a control flow graph, call trace analysis, or other flow representation of an application to identify potential functions for analysis, as well as to evaluate the downstream connections of a given function to determine when and if any side effects occur. To select a function for purity analysis, the control flow graph may be traversed to classify functions regarding their side effects. Some side effects, such as input from outside devices, may be side effects that prohibit memoization. Other side effects, such as writing to a log file, may prohibit memoization when logging is requested, but not prohibit memoization when logging may not be requests.

The control flow graph may be traversed to identify potential functions that may benefit from memoization. In general, memoization of a function that calls many other functions may yield a more significant performance benefit than memoization of functions that call fewer other functions. The selection process may favor functions that have the highest payback from memoization.

The purity of a function may be defined on a conditional basis. The conditions may be, for example, certain sets of input parameters, specific set of side effects, or other conditions. When such a condition occurs, the function may be memoized for one set of conditions and not memoized for other sets of conditions.

The purity of a function may be determined using a statistical confidence. For example, the operations of a function may be gathered over many uses, many instances, and many devices. These data may be analyzed to identify functions that behave as pure functions that may otherwise be classified as impure functions using static analysis. In some cases, a function may be considered pure when the behavior is predictable with a high confidence, such as when the behavior may be consistent with a 0.90, 0.95, 0.99, or 0.999 confidence or better.

Side effect analysis may also be a factor in determining purity. In some cases, a side effect may be analyzed against a white list or black list to classify the side effect as de minimus or substantial. Those functions with trivial or de minimus side effects may be considered pure from a side effect standpoint, while those with substantial side effects may not.

In some embodiments, the output of a side effect may be captured and treated as a function input or result. In some such embodiments, the function may be considered pure when the side effect behavior is consistent and repeatable. Further, the global state of the application or device executing the application may be considered as an input to an impure function. In cases where the global state may play a role in the consistent behavior of a function, the function may be declared pure for the specific cases corresponding to a global state.

Once a function has been identified as pure, the purity designation may be used by a memoization routine to cause the function to be memoized. In some cases, the purity designation may be transmitted to an execution environment to cause the function to be memoized. Such an execution environment may be on the same device or a different device from a purity analysis engine that designates the function as pure or not.

An offline memoization optimization mechanism may improve performance of a target executable code by monitoring the executing code and offline analysis to identify functions to memoize. The results of the analysis may be stored in a configuration file or other database, which may be consumed by an execution environment to speed up performance of the target executable code.

The configuration file or database may identify the function to be memoized and, in some cases, may include the input and output values of the function. The execution environment may monitor execution of the target code until a function identified in the configuration file may be executed. When the function is to be executed, the execution environment may determine if the input values for the function are found in the configuration file. If so, the execution environment may look up the results in the configuration file and return the results without executing the function.

In some embodiments, the configuration file may be used without changing the target code, while in other embodiments, the configuration file may be used to decorate the target code prior to execution. Some such embodiments may decorate the target code by adding memoization calls within the target code, which may be source code, intermediate code, binary executable code, or other form of executable code.

The offline analysis may use monitoring results of the target code over multiple instances of the target code. In some cases, the target code may be executed on multiple different devices, and the aggregated results may be analyzed when creating the configuration file. In some cases, the monitoring results may be collected from many different users under many different conditions.

Throughout this specification and claims, the term "configuration file" is used to denote a database that may be consumed by an execution environment. In some cases, the "configuration file" may be an actual file managed within an operating system's file system, but in other cases, the "configuration file" may be represented as some other form of database that may be consumed by the execution environment. The term "configuration file" is used as convenient description but is not meant to be limiting.

The optimization process may use data gathered by monitoring the target code during execution. The monitoring operation may passively or actively collect parameter values, then pass the collected data to a remote optimization system.

The remote optimization system may create a configuration file based on the data received from the monitored target code. In some embodiments, a baseline performance level may be identified prior to executing with the configuration file, then a performance level with the configuration file may be either measured or estimated.

In many embodiments, data may be collected when the target executable code is run to determine dynamic and operational monitored parameters. Monitored parameters collected from the target code may not include any personally identifiable information or other proprietary information without specific permission of the user. In many cases, many optimized configurations may be generated without knowledge of the workload handled by the executable code. In the case where the monitoring occurs in an execution environment such as an operating system or virtual machine, the monitoring may collect operating system and virtual machine performance data without examining the application or other workload being executed. In the case where the monitoring occurs within an application, the monitoring may collect operational and performance data without collecting details about the input or output of the application.

In the case when data may be collected without an agreement to provide optimization, the collected data may be anonymized, summarized, or otherwise have various identifiable information removed from the data.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a simplified example of an analysis sequence for assessing the purity of functions. Embodiment 100 illustrates an overall process by which functions may be memoized, including functions that fail static analysis for purity.

Memoization is an optimization technique where the results of a function may be cached the first time the function is called. When the function is called a second time with the same input values, the cached value may be retrieved without having to recalculate the value.

The effectiveness of memoization is dependent on the cost to compute the result. When the cost is high, the savings of memoization yields a high performance gain. When the cost of computing a result is minimal, memoization may be a neutral or negative to performance.

Memoization assumes that the function being memoized will return consistent results given the inputs. Functions that have side effects often cannot be memoized. Side effects may be interactions with calling functions or the outside world, such as input or output devices or systems. A side effect may include modifying an argument passed to a function, modifying a global or static variable, raising an exception, writing data to a file or display, reading data, or calling other side-effecting functions.

Embodiment 100 may be one example of an analysis sequence that may examine one function or a small group of functions at a time. Such a sequence may be useful in systems where memoization analysis may be performed while an application is running. In such embodiments, a portion of system resources may be allocated to memoization analysis, and single functions may be traced and analyzed individually. A more detailed example of such a system may be found in embodiment 400 presented later in this specification.

Memoization analysis may be performed en masse in other embodiments. In such embodiments, an application may be analyzed using an instrumented environment that may trace all functions, then evaluate the results to select functions for memoization. In such embodiments, the performance of the application may be very poor during the instrumented execution, but then the application may be executed in with the memoization results in a non-instrumented manner to realize the performance gains from memoization. A more detailed example of such a system may be found in embodiment 500 presented later in this specification.

Source code 102 may be analyzed using static code analysis 104 to identify pure functions 106 and impure functions 110. Functions that are known pure functions 106 may be capable of memoization 108.

The static code analysis 104 may examine the source code 102 to identify functions that are free from side effects. Such functions may be labeled as 'pure' based on analyzing code without executing the code. The source code 102 may be source code, intermediate code, decompiled code, or some other form of application definition.

The static code analysis 104 may create a call tree or control flow graph to determine the overall flow of an application, then traverse the representation to determine whether or not a particular function calls an impure function or has a side effect.

The impure functions 110 may be sorted 112 to identify potential candidates for analysis. The computational costs 114 of each function may be applied to each function to estimate the possible savings. The computational costs may be estimates from static analysis or may be based on monitoring the execution of the target application. When the execution of the application is monitored, each function may also be tracked to determine how many times the function was called, as well as the parameters passed to the function.

Candidate selection 116 may attempt to select those functions having a high potential performance increase if the functions were memoized. The selection criteria may score the impure functions 110 by the potential improvement along with the frequency of execution. In one example, the potential savings multiplied by the number of times a function may be called may yield a score for ranking the functions.

The selection may rank the potential functions and select one or more functions to monitor and analyze 118. In some embodiments, the monitoring and analysis may consume a global state definition 120. In some embodiments, the selection and analysis processes may iterate or cycle to examine impure functions to identify statistically pure functions 122, which may be used for memoization 108.

The analysis may measure the consistency of a function given a set of inputs. In some cases, a function may be considered pure when the function returns the same values for a given input within a statistical confidence limit. For some functions, the confidence limit may be quite stringent, such as a confidence of 0.999 or 0.9999. For other functions, the confidence limit may be much less stringent, such as 0.75, 0.80, or 0.90. The confidence limit may be a reflection of an acceptable variance limit or error that may be tolerated in results from the function.

Some functions may process information that is not subject to error, such as financial and other transactions. When such functions are not pure from static analysis, such functions may not be memoizable because the correctness of the function may have adverse effects. Another class of functions may permit some error, and such functions may be memoizable even when the memoized value may not reflect the exact results each function call may have made. An example of such a class of functions may be the generation of background areas during image processing for a computer game. The accuracy of such functions may not be critical and as such may be memoized when the repeatability confidence may be relatively low.

Figure 2:
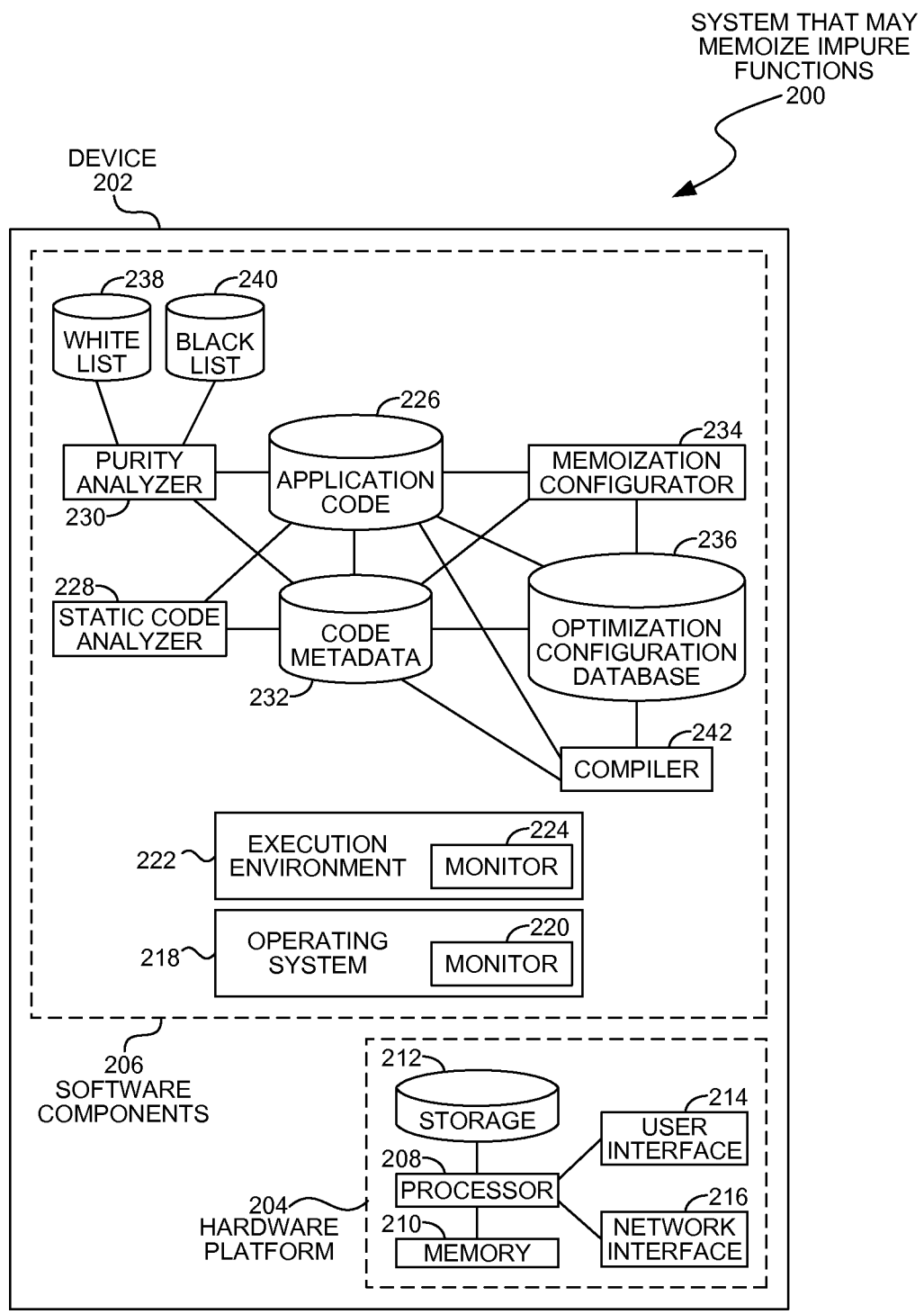
FIG. 2 is a diagram illustration of an embodiment showing a device that may memoize impure functions.

FIG. 2 is a diagram of an embodiment 200 showing a computer system with a system with an optimization server. Embodiment 200 illustrates hardware components that may deliver the operations described in embodiment 100, as well as other embodiments.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 may illustrate a single device on which memoization optimization may be deployed. The optimization may evaluate functions to identify pure functions and impure functions, then evaluate the impure functions to identify which of those impure functions may behave as pure functions. The system may create a configuration database that may be consumed during execution. The configuration database may contain records for functions that may be memoized, among other optimization data.

Embodiment 200 illustrates a device 202 that may have a hardware platform 204 and various software components. The device 202 as illustrated represents a conventional computing device, although other embodiments may have different configurations, architectures, or components.

In many embodiments, the optimization server 202 may be a server computer. In some embodiments, the optimization server 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various applications 244 and services may operate. An operating system may provide an abstraction layer between executing routines and the hardware components 204, and may include various routines and functions that communicate directly with various hardware components.

An application code 226 may be executed by the operating system 218 or by the execution environment 222, depending on the embodiment. Some applications may execute natively on the operating system 218, while other applications may execute using a virtual machine or other execution environment 222. For the purposes of this specification and claims, an "execution environment" may be an operating system, virtual machine, or any other construct that may manage execution of an application. Typically, an execution environment may start, stop, pause, and manage execution, as well as provide memory management functions, such as memory allocation, garbage collection, and other functions.

A monitor 220 or 224 may collect operational data from an application running on the operating system 218 or execution environment 222, respectively. The monitors may collect function call information, as well as performance parameters such as the resources consumed by an application and various functions that make up the application.

The application code 226 may be analyzed using a static code analyzer 228. The static code analyzer 228 may classify functions as pure and impure. Impure functions may be those that may have side effects or that may not deterministically return the same values for a given input. The static code analyzer 228 may store the results of static analysis in a repository for code metadata 232.

Static code analysis may be performed on source code, intermediate code, object code, decompiled code, machine code, or any other software form. In some cases, the static code analyzer 228 may operate as part of a compiler.

A purity analyzer 230 may evaluate the code metadata 232 in conjunction with the application code 226 to identify impure functions that may be memoized. Such functions may be analyzed to determine whether or not the functions may be considered pure for memoization, even though the functions may be considered impure under static analysis.

The purity analyzer 230 may identify side effects for impure functions and attempt to determine whether or not the side effects may have a substantial effect. Such analysis may involve tracing the function to identify and classify the side effects. The classification may be done by comparing the side effects using a white list 238 or black list 240. The white list 238 may contain a list of side effects that are innocuous or for which the side effects may be ignored for memoization. The black list 240 may contain side effects that may have substantial effects. Side effects that may be found in the black list 240 may eliminate a function from consideration as a memoizable function.

Side effects that may not be found in the white list 238 or black list 240 may be classified using behavioral data collected during tracing. Such side effects may be traced under many different conditions and many different runs to collect behavior data. When the behavior of the side effect may be predictable with statistical confidence, the side effect may be considered to not eliminate a function from possible memoization.

Similarly, the behavior of a function may be traced over many different runs and under different conditions. The tracing may capture input parameters and output values each time the function may be called, and the purity analyzer 230 may correlate the input parameters and output values. In some embodiments, external state information may also be collected. In such embodiments, the external state information may be considered as input variables for the function in an attempt to determine conditions under which the function may behave predictably and reliably.

For functions that behave predictably and reliably with a statistical confidence, those functions may be stored in the code metadata and treated as pure functions for memoization.

A memoization configurator 234 may capture the code metadata 232 and create an optimization configuration database 236. The optimization configuration database 236 may be used during program execution to identify functions that may be memoized. The configuration database 236 may be consumed by the execution environment 222 or operating system 218 in various cases.

In some cases, a compiler 242 may consume the configuration database 236 to compile the application code 226 with memoization enabled for those functions identified as memoizable.

Figure 3:
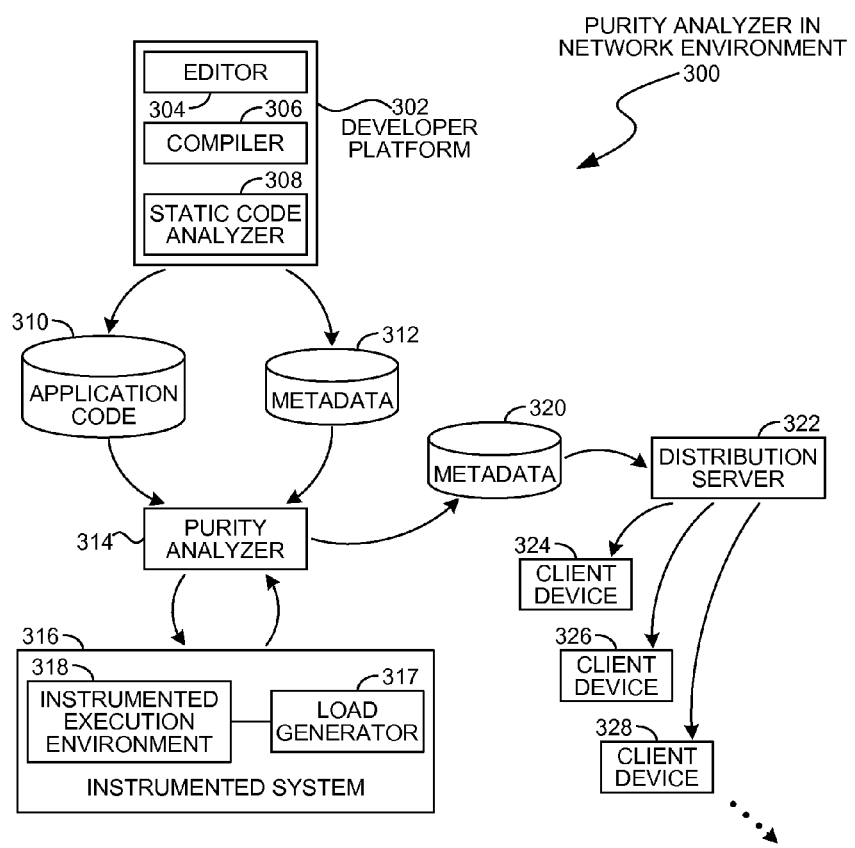
FIG. 3 is a diagram illustration of an embodiment showing a purity analyzer in a network environment.

FIG. 3 is a diagram illustration of an embodiment 300 showing a system that may perform purity analysis in a network environment. Embodiment 300 illustrates a system that may perform purity analysis, then distribute the results to various client devices that may consume the results.

Embodiment 300 may illustrate a mechanism by which an entire application may be analyzed for memoization. The application may be executed in an instrumented execution environment where each function may be traced and operational data may be collected. A subsequent purity analysis may examine each function for memoization.

An application may be created and edited on a developer platform 302. The developer platform 302 may have an editor 304 and compiler 306 with which a programmer may create, test, and debug an application. In some embodiments, a static code analyzer 308 may also be contained in the developer platform 302.

The output of the developer platform 302 may be application code 310 and code metadata 312, which may be consumed by a purity analyzer 314. The purity analyzer 314 may use an instrumented system 316 to collect trace data. The instrumented system 316 may execute the application code 310 in an instrumented execution environment 318 that may collect operational data for various functions.

The instrumented environment 318 may collect operational data for all functions. In such embodiments, a purity analyzer 314 may analyze each impure function for memoization. Such analysis may be in contrast with the mechanism described in embodiment 100 where functions may be independently selected and analyzed.

In some embodiments, a load generator 317 may create a wide range of loads that may be processed by the application code 310. The load generator 317 may attempt to exercise the application code 310 so that operational data may reflect a broad range of conditions. Such exercising may be used to identify those impure functions that may operate with statistically significant reliability and may therefore be treated as memoizable.

The output of the purity analyzer 314 may be metadata 320 that may be packaged and distributed by a distribution server 322 to various client devices 324, 326, and 328. The client devices may consume the memoization information during execution of the application 310.

Figure 4:
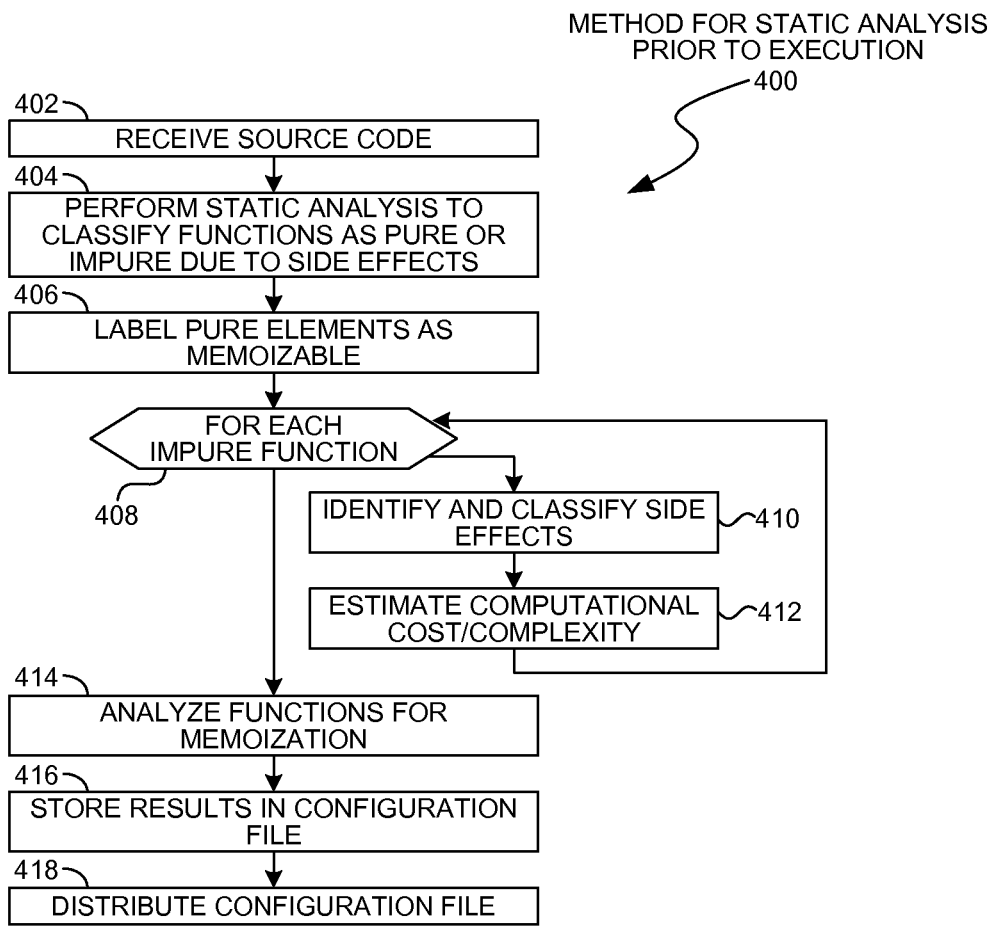
FIG. 4 is a flowchart illustration of an embodiment showing a method for static analysis prior to execution.

FIG. 4 is a flowchart illustration of an embodiment 400 showing a method for independently evaluating functions for memoization. Embodiment 400 illustrates the operations of a system that may identify impure functions for memoization analysis and test those functions independently.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is a method by which functions may be selected for memoization. Functions that are pure based on a static analysis may be memoized. Other functions that behave as pure functions but which fail static purity analysis may be treated as pure functions.

The analysis of impure functions may involve instrumenting the function and running the function under load to determine whether the function behaves consistently as well as to collect any side effect information. When the behavior is consistent and the side effects are de minimus, the function may be memoized.

Embodiment 400 illustrates a high level process. Detailed examples of some parts of embodiment 400 may be found in embodiments 500, 600, and 700 presented later in this specification.

Source code may be received in block 402. The source code may be any type of code that may be analyzed. In some cases, the source code may be source code, intermediate code, decompiled code, or other type of code.

A static analysis may be performed in block 404 to identify pure and impure functions. Pure functions may be those functions that return a consistent result and that have no observable side effects. In many cases, the purity of a function may be determined with certainty through direct analysis of source code.

Each of the pure functions may be labeled as memoizable in block 406.

For each impure function in block 408, any side effects may be identified and classified in block 410 and the computational cost or complexity may be estimated in block 412. The analysis of blocks 408 through 412 may be used to collect various data about the functions, which may be evaluated in block 414 to analyze the functions for memoization. The results may be stored in a configuration file in block 416, and the configuration file may be distributed in block 418.

Figure 5:
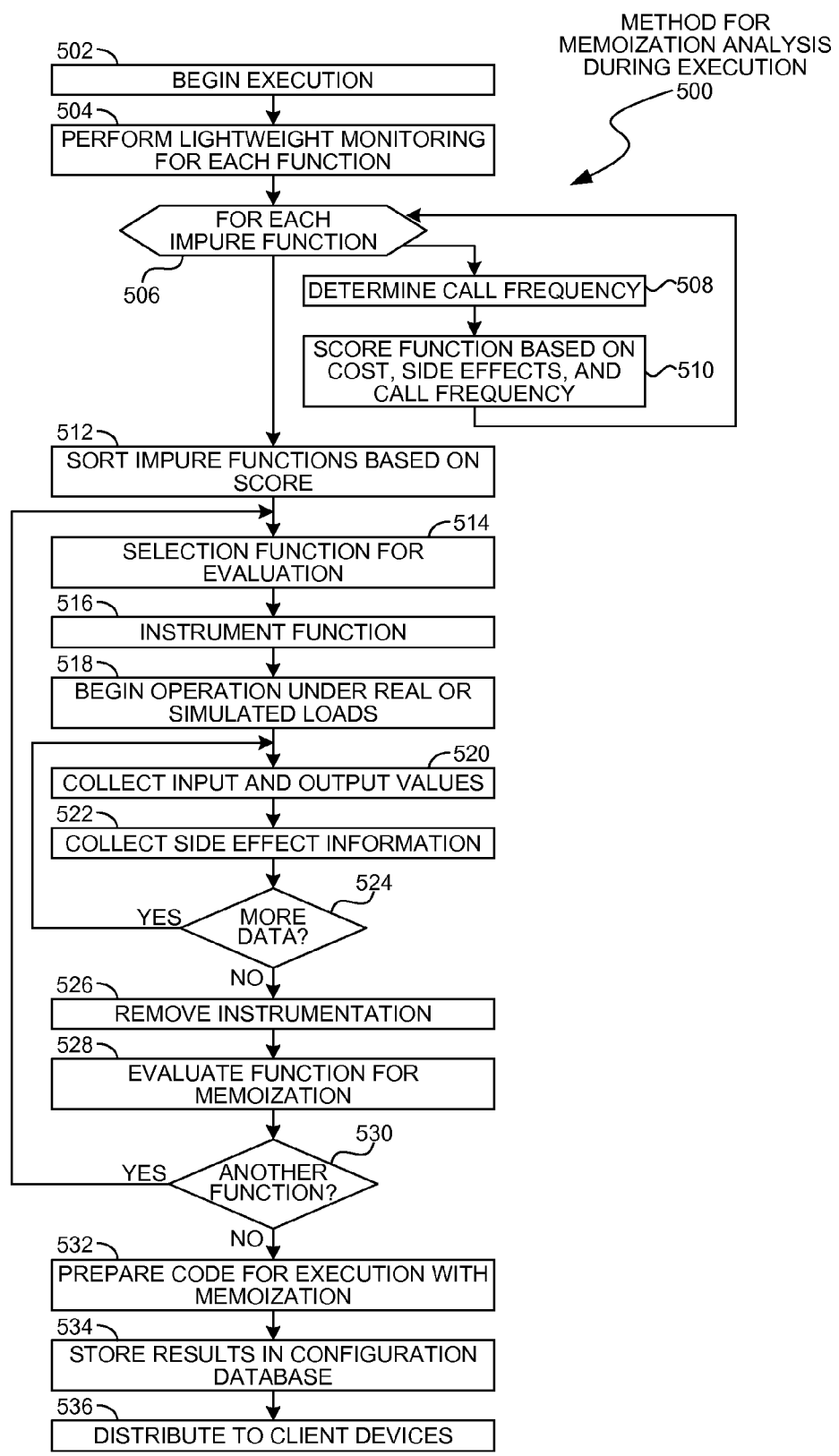
FIG. 5 is a flowchart illustration of an embodiment showing a method for memoization analysis during execution.

FIG. 5 is a flowchart illustration of an embodiment 500 showing a method for evaluating functions for memoization. Embodiment 500 illustrates the operations of a system that may select candidate functions for memoization, then evaluate the functions to determine if those functions can be memoized.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 is a more detailed example of a memoization evaluation that may be performed in the analyze block 414 from embodiment 400. Embodiment 500 illustrates a method by which functions may be evaluated individually, as opposed to evaluating many or all functions en masse. Embodiment 500 may be a detailed example of memoization evaluation that may occur after static code analysis where pure and impure functions have been identified.

Embodiment 500 is an example of a method that may be performed while an application may be running. By selecting individual functions for evaluation, a system may improve its performance over time without producing a large burden on the system. Such a system may 'learn' or improve itself over time.

Execution of an application may begin in block 502 and lightweight monitoring may be applied in block 504. The lightweight monitoring may evaluate each impure function in block 506 to determine call frequency in block 508 and score the function based on cost, side effects, and call frequency in block 510.

The evaluation of blocks 504 to 510 may collect information that may be used to score impure functions for evaluation. The score may attempt to identify those impure functions for which memoization may be both likely and have a large performance improvement. The call frequency multiplied by the estimated computational cost may be an estimate or proxy for the potential benefit of memoization.

The side effect analysis that may be performed in block 510 may be a first order screening that may eliminate from consideration those functions with side effects that may prohibit memoization. A more detailed examination of side effects may be illustrated in embodiment 600.

The impure functions may be sorted in block 512 and a function may be selected in block 514 for evaluation.

The function may be instrumented in block 516 and the function may be operated under real or simulated loads in block 518. The instrumentation may collect operational data, such as the parameters passed to the function and returned from the function in block 520 as well as any information regarding side effects in block 522. The instrumentation may continue in block 524 until enough data have been collected. After collecting sufficient data in block 524, the instrumentation may be removed in block 526.

The function may be evaluated for memoization in block 528. An example of such evaluation may be found in embodiments 600 and 700, presented later in this specification.

If another function is available for evaluation in block 530, the process may return to block 514 to select another function for evaluation.

The code may be prepared for execution with memoization in block 532. In some embodiments, each function that may be ready for memoization may be memoized as soon as the evaluation in block 528 has completed. In other embodiments, the memoization may be deployed later.

The results of the memoization analysis may be stored in a configuration database in block 534, which may be distributed to client devices in block 536.

Figure 6:
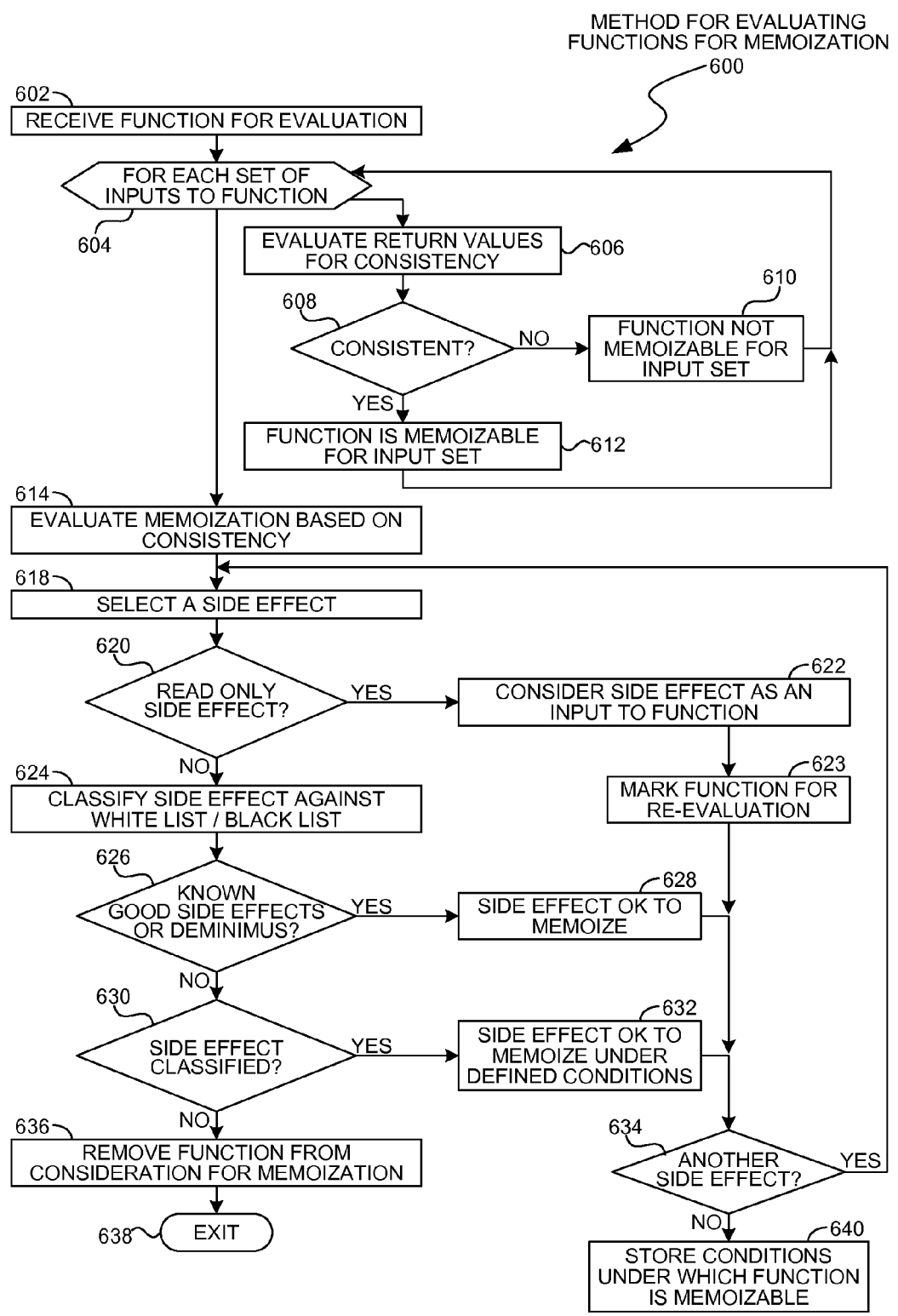
FIG. 6 is a flowchart illustration of an embodiment showing a method for evaluating functions for memoization.

FIG. 6 is a flowchart illustration of an embodiment 600 showing a detailed method for evaluating functions for memoization. Embodiment 600 illustrates a method that considers the consistency of a function for memoization, as well as the side effects when determining whether or not to memoize a function.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 illustrates a method for evaluating a function for consistency. Functions that behave in a consistent manner may be memoized, and embodiment 600 illustrates one method by which the consistency may be determined with a statistical level of confidence. The consistency may be defined for certain conditions and not for others. For example, some input parameters or other variables may cause the function to behave unpredictably, while under other conditions, the function may behave predictably and consistently.

Embodiment 600 also illustrates a method for analyzing side effects. Side effects may be any observable outside interaction for a function, other than the parameters sent to the function and those returned.

In some cases, a function may have side effects that may be read only. Read only side effects may read a memory value that may be outside the scope of the input parameters passed to the function. When such a side effect may be encountered, the side effect may be considered as an input to the function. The function may be re-evaluated for consistency and other side effects to determine whether the function may be memoized.

A read only side effect may be a side effect that accesses a memory object without mutating the object. When a mutation of a memory object occurs, the side effect may not be pure. However, when the side effect merely reads the memory object, the memory object may be considered as an input to the function.

A white list, black list, or other database may be referenced when evaluating side effects. In some embodiments, a white list may be used to identify side effects that may be known to be innocuous or to have effects that are de minimus. Such side effects may be ignored and may thus permit the impure function to be memoized. A black list may be used to identify those side effects for which memoization would be improper. Such side effects may remove the function from consideration for memoization.

Manual analysis and classification may place certain side effects in a white list or black list. Manual analysis may involve having a programmer, analyst, or other person evaluate the side effect to determine whether the side effect is de minimus or may have some other classification. In some cases, side effects that have not been classified may be placed in a database for human analysis and classification.

In some cases, the side effect may be classified into different classifications, where the classification may indicate when memoization may be appropriate or not. For example, a side effect may perform logging used for debugging. In such an example, the function may be memoized when logging is not desired, but not memoized when logging may be requested. Such a function may be classified as not being memoizable when logging is desired but memoizable when logging is not requested. The classification may be added to a configuration file as a condition under which memoization may or may not occur.

A function may be received in block 602. Each set of inputs to the function may be evaluated in block 604. The set of inputs may be parameters passed to the function. In some cases, the set of inputs may be additional state items, such as memory values for read only side effects, calling function identifiers, or other external state metadata.

For a given set of inputs, the return values may be evaluated for consistency in block 606. In some cases, a statistical confidence may be generated from repeated observations of the function. When the return values are not consistent within a statistical confidence in block 608, the function may be considered not memoizable for the input set in block 610. When the return values are consistent in block 608, the function may be considered memoizable in block 612.

The consistency of the function may be evaluated in block 614. In some cases, a function may be considered consistent under one group of input sets, but not consistent under another group of input sets. In such cases, the function may be memoizable under conditions when the function behaves consistently, but not memoizable otherwise. In some cases, the evaluation of blocks 604 through 612 may reveal that the function may be consistent under all input sets.

The side effects may be evaluated by classifying the side effects and translating the classification to the memoization of the function.

A side effect may be selected in block 618.

When the side effect is a read only side effect in block 620, the side effect may be considered as an input to the function in block 622 and the function may be marked for reevaluation in block 623. The reevaluation may cause the function's consistency to be evaluated to determine if the function behaves consistently with the side effect considered as an input parameter to the function.

The side effect may be classified in block 624 using a white list, black list, or other database. When the side effect is known good or has de minimus effects in block 626, the side effect may not disqualify the function for memoization in block 628.

When the side effect may have a classification in block 630, the side effect may disqualify the function for memoization in one condition but not another. Such a condition may be added to the memoization information in block 632. An example of a classified side effect may be a side effect that may be used for debugging or logging but may not otherwise be used.

If the side effect is not classified in block 630, the side effect may disqualify the function from memoization in block 636. When a function is disqualified in block 636, the process may end in block 638.

After the function may be marked in block 623, 628, or 632 and another side effect is available for evaluation, the process may return to block 618. When all of the side effects have been evaluated, the conditions under which the function may be memoized may be stored in block 640.

Figure 7:
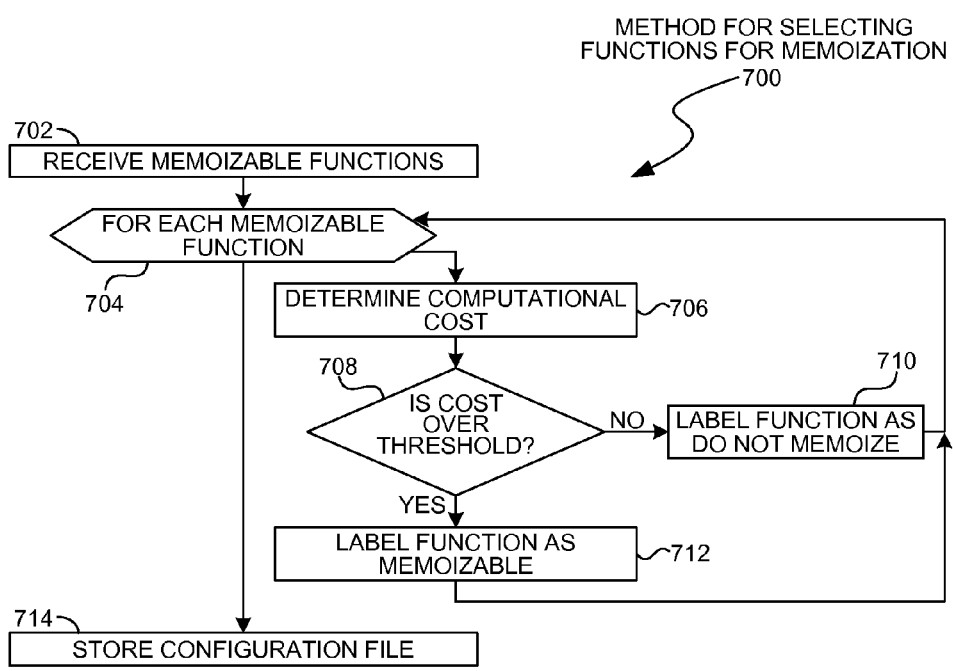
FIG. 7 is a flowchart illustration of an embodiment showing a detailed method for selecting functions for memoization.

FIG. 7 is a flowchart illustration of an embodiment 700 showing a method for evaluating functions for memoization. Embodiment 700 illustrates an evaluation of memoizable functions to determine whether memoizing the functions may result in a performance savings.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 700 may illustrate a method by which functions that may be tagged as memoizable are evaluated for memoization. In many embodiments, memoization adds overhead to a function, which may cause a function to perform slower than if the memoization were not present. Embodiment 700 compares the computational cost of the function to a threshold to determine if the potential savings justifies memoization.

One or more memoizable functions may be received in block 702. The memoizable functions may be pure functions or impure functions that may have been analyzed by the process in embodiment 600.

For each memoizable function in block 704, the computational cost may be determined in block 706. When the cost not over a predefined threshold in block 708, the function may be labeled as not to memoize in block 710. When the cost is over the threshold in block 708, the function may be labeled as memoizable in block 712. The results may be stored in a configuration file in block 714.

Figure 8:
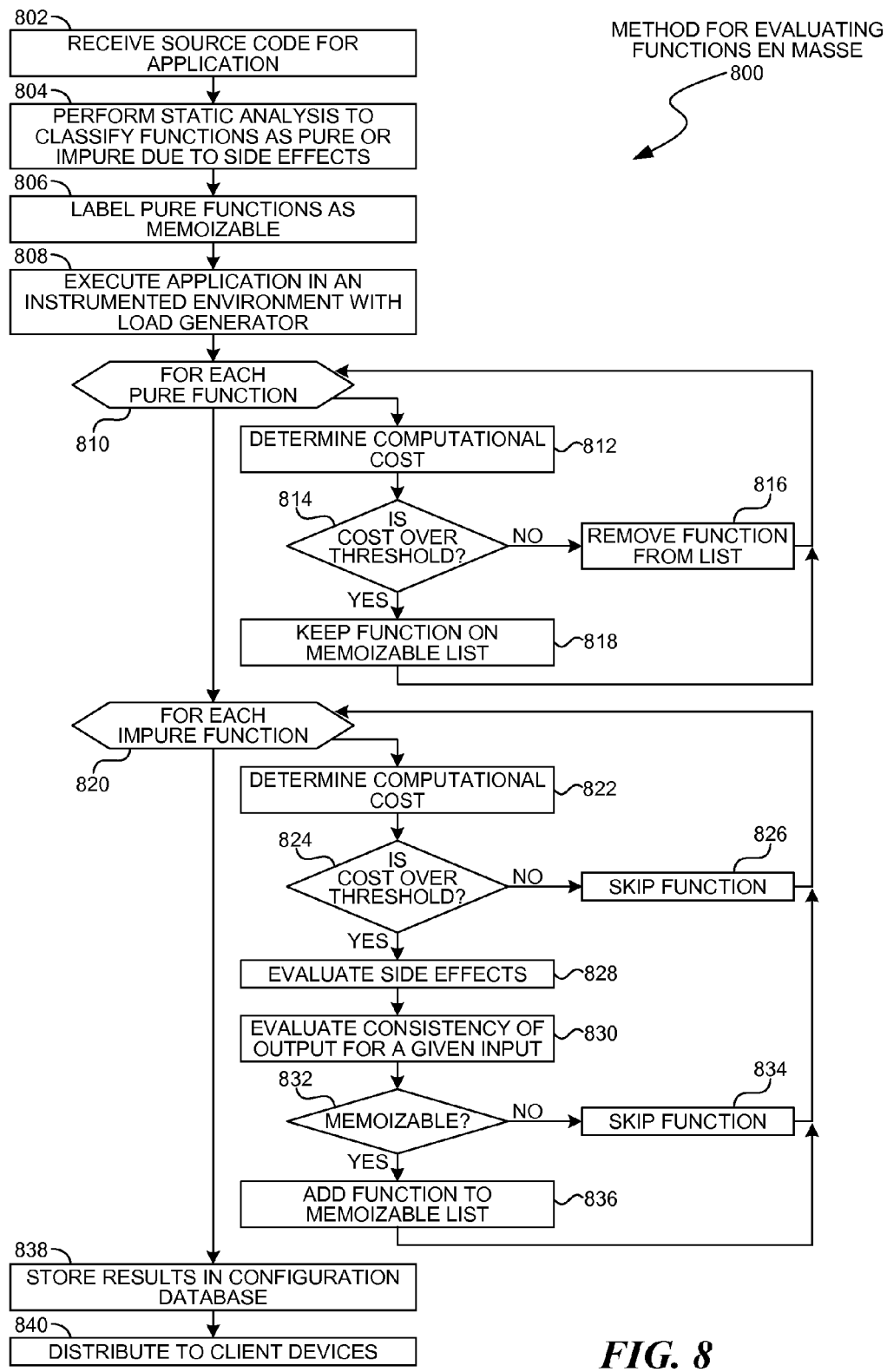
FIG. 8 is a flowchart illustration of an embodiment showing a method for evaluating functions en masse.
Figure 9:
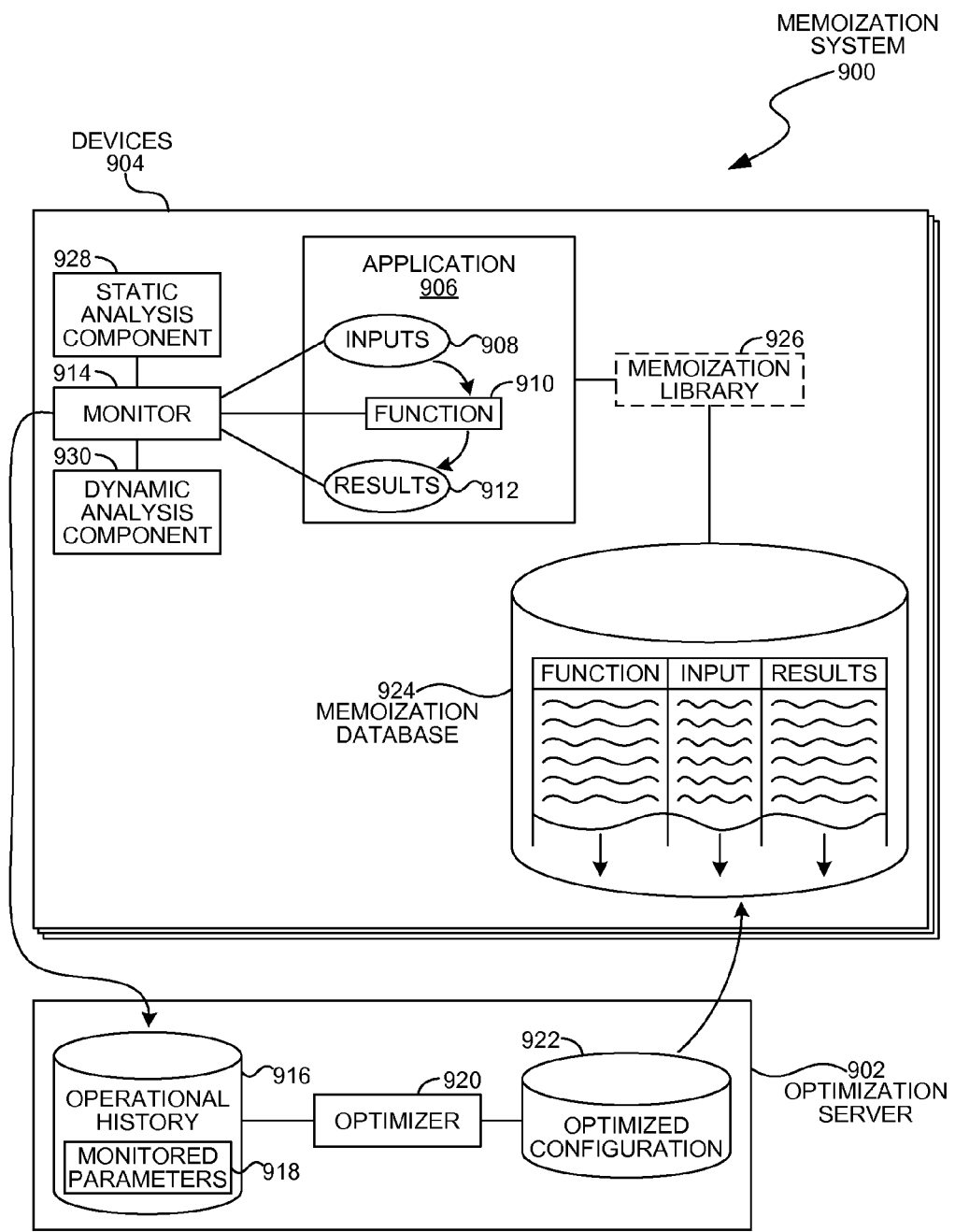
FIG. 9 is a diagram illustration of an embodiment showing a system for memorizing an application.

FIG. 8 is a flowchart illustration of an embodiment 800 showing a method for evaluating functions en masse for memoization. Embodiment 800 illustrates a method whereby an instrumented environment may capture operational data from each function in an application, then perform memoization optimization for the entire application.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 800 illustrates a memoization analysis that may be performed on an entire application at one time. The process of embodiment 800 illustrates an example of evaluating an application in an instrumented environment and creating a configuration database that may be used when the application may be executed in a production environment.

The instrumented environment may exercise an application under many different loads while collecting operational data regarding each function. The operational data may include input parameters, internal and external state descriptors, return values, and any other information that may affect the operation of various functions in the application. The loads may include many simulated inputs or other loads that may cause many of the functions to be executed.

The results of the instrumented runs may be analyzed to identify pure functions, as well as impure functions that behave as pure functions. In some cases, the impure functions may behave as pure functions in certain circumstances but not in other circumstances.

Embodiment 800 analyzes all of the functions in an application and identifies those that are memoizable as having a higher performance increase than cost to memoize. Such a screening may be performed on all pure functions as well as impure functions. After screening, the impure functions may be evaluated to determine whether or not the functions may be memoizable and under which conditions. The memoizable functions may be stored in a configuration database, which may be used during subsequent executions of the application.

The source code for an application may be received in block 802. The source code may be source code, intermediate code, decompiled code, or any other code that may be analyzed using static analysis in block 804. The static analysis in block 804 may identify functions as pure or impure, based on side effects or other issues.

In block 806, all of the pure functions may be labeled as memoizable based on the static analysis.

In block 808, the application may be executed in an instrumented environment. In some cases, the instrumented environment may include a load generator which may exercise the application. During the executing in the instrumented environment, various operational data may be collected. The operational data may include a measurement of the computational or other costs for executing specific functions, as well as capturing the input parameters and results returned by each function. In many cases, the instrumented environment may also capture the state of the application and system at various points during execution.

Each pure function may be analyzed in block 810. For each pure function in block 810, a computational cost for the function may be determined in block 812. When the cost is below a threshold in block 814, the function may be removed from the memoizable list in block 816. When the cost is over the threshold in block 814, the function may be kept on the memoizable list in block 818.

The threshold may represent a minimum computational cost or overhead that memoization may add to a function. When the cost of implementing memoization exceeds the benefit, memoization may not be performed for the specific function.

The computational cost for each function may be determined either statically or dynamically. In a static mechanism, the cost may be estimated by the number of memory accesses, function calls, or other steps performed by the source code. In a dynamic mechanism, the cost may be measured by the instrumented environment. Such a mechanism may measure the resources consumed and time consumed by a function.

The resources may include computational resources, memory resources, storage resources, network access resources, or other resource.

Similarly, each impure function may be analyzed in block 820. For each impure function in block 820, a computational cost may be determined in block 822. When the computational cost is not over a threshold in block 824, the function may be skipped in block 826 and not considered for memoization. When the computational cost is above the threshold in block 824, further analysis may be performed to determine whether or not the impure function can safely memoized.

The impure function may be evaluated for side effects in block 828 and evaluated for consistency in block 830. An example of such evaluations may be illustrated in embodiment 600 presented earlier in this specification.

When the impure function may be considered unsafe for memoization in block 832, the function may be skipped in block 834. When the impure function may be considered safe for memoization in block 832, the impure function may be added to the memoizable list in block 836.

After analyzing each impure function, the results may be stored in a configuration database in block 838 and distributed in block 840 to client devices.

Embodiment 900 illustrates a mechanism by which an offline or remote optimization server 902 may participate in memoization. The optimization server 902 may collect data from various devices 904 to identify which functions may be appropriate for memoization. In some cases, the optimization server 902 may merely identify the functions to memoize, and in other cases, the optimization server 902 may also determine the memoized results of the functions.

The optimization sever 902 may receive results from many different devices 904 and analyze the aggregated results. In such embodiments, the optimization server 902 may analyze much more data than could be analyzed on a single device.

A function may be identified as memoizable when memoization meets a set of objectives. The objectives may be to increase throughput, reduce cost, or other objectives. In many cases, a limited cache or database of memoized functions may be available, forcing the optimization to select a subset of available functions for memoizing.

An application 906 may execute on the devices 904. Within the application 906, a set of inputs 908 may be passed to a function 910, which may produce results 912. As the application 906 executes, a monitor 914 may collect data. The monitor 914 may collect various monitored parameters 918 that may be transmitted to the optimization server 902 and stored in an operational history database 916.

An optimizer 920 may analyze the operational history database 916 to generate an optimized configuration 922. The optimized configuration may be one or more records that may be transmitted to the devices 904 and stored in a memoization database 924. The memoization database 924 may contain records with identifiers for specific functions, along with the inputs and results for the functions.

The memoization records may include various metadata about the functions. For example, the metadata may include whether or not a specific function is appropriate for memoization. In some cases, the metadata may identify specific conditions for memoizing a function, such as memoizing a function with only a subset of inputs and not memoizing for other sets of inputs.

In some embodiments, the metadata may include a binary indicator that indicates whether or not a specific function may be memoized or not. In some instances, the metadata may include a definition of which instances a function may or may not be memoized. For example, some embodiments may have a descriptor that permits memoization for a function with a set of inputs, but does not permit memoization with a different set of inputs. In another example, the metadata may indicate that the function may be memoized for all inputs.

In some embodiments, the metadata may indicate that a specific function is not to be memoized. Such metadata may affirmatively show that a specific function is not to be memoized. The metadata may also indicate that a different function is to be memoized.

When the application 906 is executed on the device 904, a memoization library 926 may be a set of routines that may be called to implement memoization. The memoization library 926 may be called with each memoizable function, and the memoization library 926 may perform the various functions for memoizing a particular function, including managing the various inputs and results in the memoization database 924.

In some cases, the memoization library 926 may populate the memoization database 924. In one such example, the optimization server 902 may identify a specific function for memoization. Once identified, the memoization library 926 may store each call to the function, along with its inputs and results, thus populating the memoization database 924.

In other cases, the memoization database 924 may be populated by the optimization server 902. In such cases, the memoization library 926 may not add information to the memoization database 924.

In one such embodiment, the optimization server 902 may collect data from a first device and transmit an updated configuration 922 to a second device. In such an embodiment, the device receiving the records in the memoization database 924 may not have been the device that generated the data used to create the record.

The optimization server 902 may transmit the optimized configuration 922 to the devices 904 through various mechanisms. In some cases, the optimization server 902 may have a push distribution mechanism, where the optimization server 902 may transmit the optimized configuration as the configuration becomes available. In some cases, the optimization server 902 may have a pull distribution mechanism, where the devices 904 may request the optimized configuration, which may be subsequently transmitted.

The monitored parameters 918 gathered by the monitor 914 may include various aspects of the function 910. For example, the monitored parameters 918 may include information about the amount of work consumed by the function 910. Such information may be expressed in terms of start time and end time from which elapsed time may be computed. In some cases, the amount of work may include the number of operations performed or some other expression.

Other aspects of the function 910 may include the inputs 908 and results 912 for each execution of the function. The inputs and results of the function 910 may be stored and compared over time. Some embodiments may compare the inputs 908 and results 912 over time to determine if a function is repeatable and therefore memoizable.

Some embodiments may include a static analysis component 928 and dynamic analysis component 930 which may gather static and dynamic data, respectively, regarding the operation of the function 910. A static analysis component 928 may analyze the function 910 prior to execution. One such analysis may classify the function 910 as pure or not pure. A pure function may be one in which the function has no side effects and therefore should return the same value for a given input. Impure functions may have side effects and may not return the same results for a given input.

In some embodiments, the purity of a function may be determined based on static analysis of the function. In other embodiments, the purity may be determined through observations of the behavior of the function. In such embodiments, the repeated observation of the function may be used to determine a statistical confidence that the function may be pure. Such a dynamic evaluation of function purity may be limited to a set of conditions, such as when a first set of inputs are applied, but purity may not be true when a second set of inputs are applied, for example.

The static analysis component 928 may create a control flow graph for the application 906, which may be included in the monitored parameters 918. The optimizer 920 may traverse the control flow graph as part of a process of selecting a function for memoization.

A dynamic analysis component 930 may analyze the actual operation of the function 910 to generate various observations. In some cases, the dynamic analysis component 930 may measure the frequency the function 910 was called with the various inputs 908. The dynamic analysis may also include performance measurements for the function 910.

The optimized configuration 922 may be distributed to the devices 904 in many different forms. In some cases, the optimized configuration 922 may be distributed in a file that may be transmitted over a network. In other cases, the optimized configuration 922 may be transmitted as records that may be added to the memoization database 924.

The example of embodiment 900 illustrates several client devices 904 that may provide data to an optimization server 902. In a typical deployment, the client devices may be executing different instances of the application 906, each on a separate device.

In another embodiment, separate instances of the application 906 may be executing on different processors on the same device. In one version of such an embodiment, a monitor 914 may be operating on a subset of the processors and the remaining processors may be executing the application 906 without the monitor 914 or with a different, lightweight monitor. In such an embodiment, some of the processors may execute the application 906 with memoization but without the monitor 914.

Figure 10:
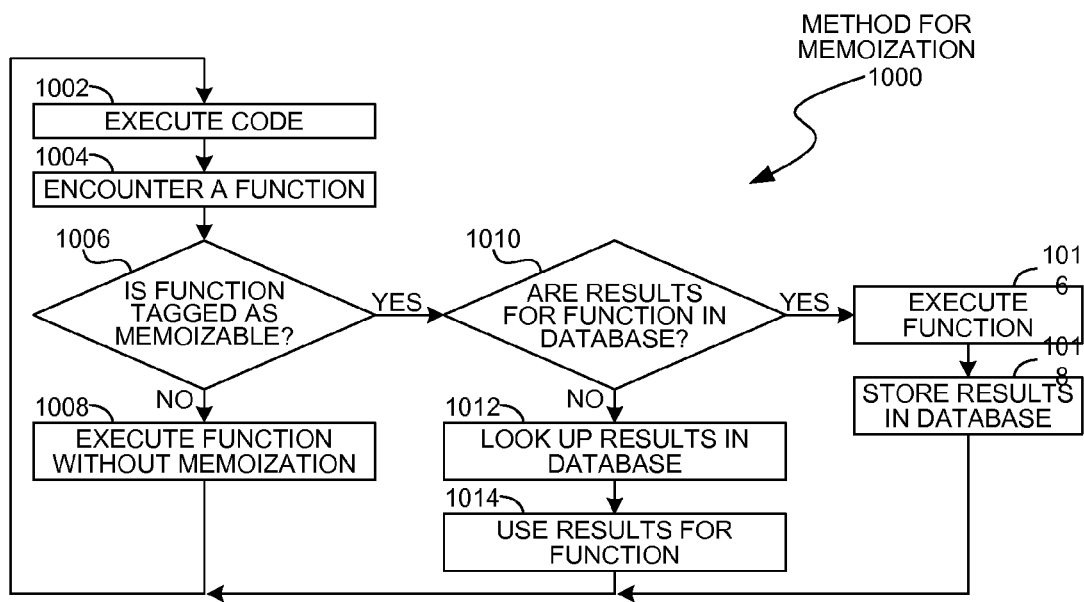
FIG. 10 is a flowchart illustration of an embodiment showing a method for memoization.

FIG. 10 is a flowchart illustration of an embodiment 1000 showing a method for memoization. The method of embodiment 1000 may illustrate a memoization mechanism that may be performed by an execution environment by monitoring the operation of an application and applying memoization.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1000 illustrates a method that may be performed in a virtual machine, operating system, or other execution environment. The execution environment may memoize any function that has a record in a memoization database by monitoring execution, detecting that the function has been identified for memoization, and then memoizing the function.

The execution environment may be a virtual machine, operating system, or other software construct that may execute an application. In some cases, the execution environment may automatically memoize a function when that function is identified in a memoization database. In some embodiments, such an execution environment may receive optimization information from a process that identifies functions to memoize, and such a process may execute on the same device or a different device from the execution environment.

The application code may be executed in block 1002. During execution, a function may be encountered in block 1004. If the function has not been tagged as memoizable in block 1006, the function may be executed in block 1008 without any memoization. The process may return to block 1002 to continue execution in block 1002.

If the function has been tagged as memoizable in block 1006, and the results are in the memoization database in block 1010, the results may be looked up in the database in block 1012 and returned as the results for the function in block 1014. The process may return to block 1002 to continue execution without having to execute the function.

When the process follows the branch of blocks 1010-1014, the memoization mechanism may avoid the execution of the function and merely look up the answer in the memoization database. Such a branch may yield large improvements in processing speed when the computational cost of the function is large.

If the results are not found in the database in block 1010, the function may be executed in block 1016 and the results may be stored in the memoization database in block 1018. The process may return to block 1002 to continue execution.

The branch of blocks 1016-1018 may be performed the first time a function executes with a given input. Each time after the function is called with the same input, the branch of 1010-1014 may be executed, thus yielding a performance improvement.

The application code executed in block 1002 may be any type of executable code. In some cases, the code may be an actual application, while in other cases, the executable code may be an operating system, execution environment, or other service that may support other applications. In such cases, the process of embodiment 1000 may be used to speed up execution of the operating system or execution environment.

Figure 11:
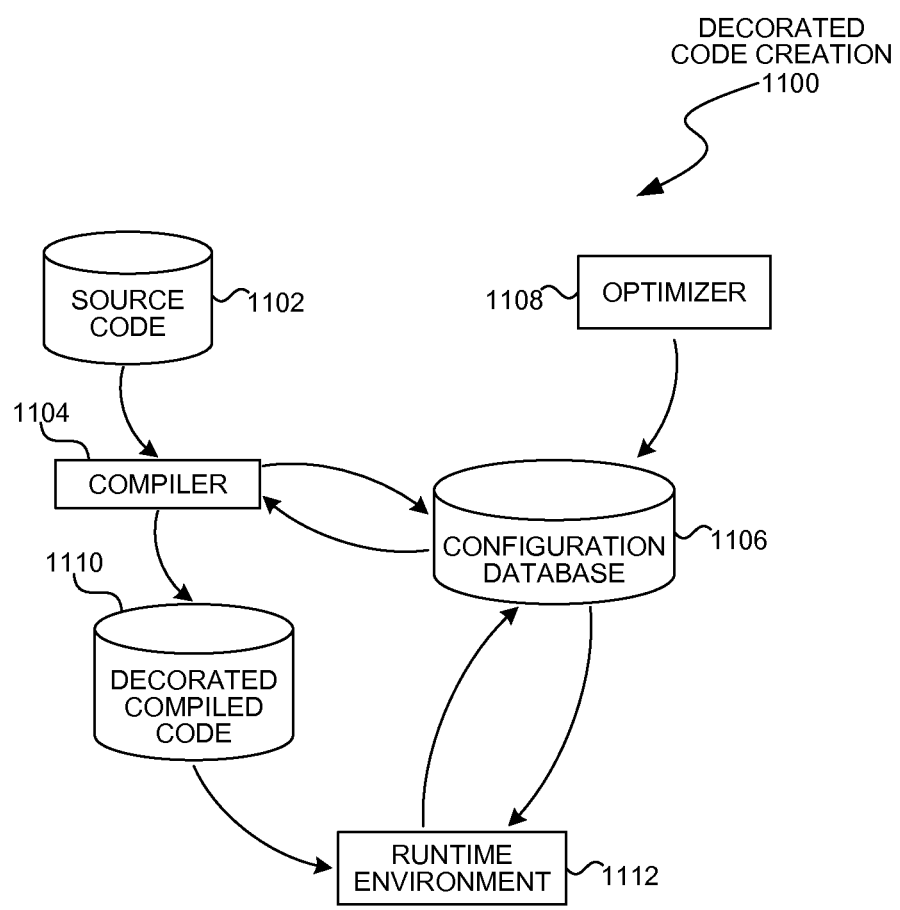
FIG. 11 is a diagram illustration of an embodiment showing a system for creating decorated code.

FIG. 11 is a diagram illustration of an embodiment 1100 showing the creation of decorated code. Embodiment 1100 illustrates how a configuration database may be used during compilation to annotate, decorate, or otherwise modify source code prior to execution.

Embodiment 1100 is an example method by which code may be analyzed and decorated prior to execution. The process of embodiment 1100 may be performed during compilation, or during some other pre-execution process. During compiling, the process may receive source code and emit object code. In such a case, the beginning code may be source code, intermediate code, or other form of code that may be compiled into a lower level code.

In some cases, the process of embodiment 1100 may be performed in a just in time environment. For example, the process of embodiment 1100 may be performed by a just in time compiler to add memoization decorations to intermediate code at runtime. In such cases, a configuration database may be downloaded and decorations added to an application close to real time.

Embodiment 1100 may be performed on precompiled code in some cases. For example, object code may be decompiled and then analyzed using embodiment 1100. In such a case, the memoization decorations may be added to existing executable code.

Source code 1102 may be compiled by a compiler 1104. During compilation, an examination of each function call may be performed. When a function call may be found in a configuration database 1106, the code may be decorated to produce decorated compiled code 1110.

The decorated compiled code 1110 may be consumed by the runtime environment 1112.

An optimizer 1108 may produce the configuration database 1106. In some cases, the optimizer 1108 may consume tracing code that may be generated by interpreted or compiled code, while the configuration database 1106 may be consumed by compiled code.

The decorations performed during compiling may be merely flagging a function call that a record in the configuration database 1106 may exist. In such an embodiment, the runtime environment 1112 may attempt to look up the function call in the configuration database 1106.

In other embodiments, the decorations may include adding instructions to the decorated compiled code 1110 that perform a lookup against the configuration database 1106.

In still other embodiments, the decorations may include information from the configuration database 1106 that may be used by the runtime environment 1112. In such embodiments, the decorations may include all of the information regarding the modified function call and the runtime environment 1112 may not query the configuration database 1106 at runtime.

The source code 1102 may be human readable source code which may produce intermediate code or machine executable code. In some cases, the source code 1102 may be intermediate code that may be compiled to machine executable code.

The compiler 1104 may be a just-in-time compiler that may perform compilation at runtime in some embodiments.

Figure 12:
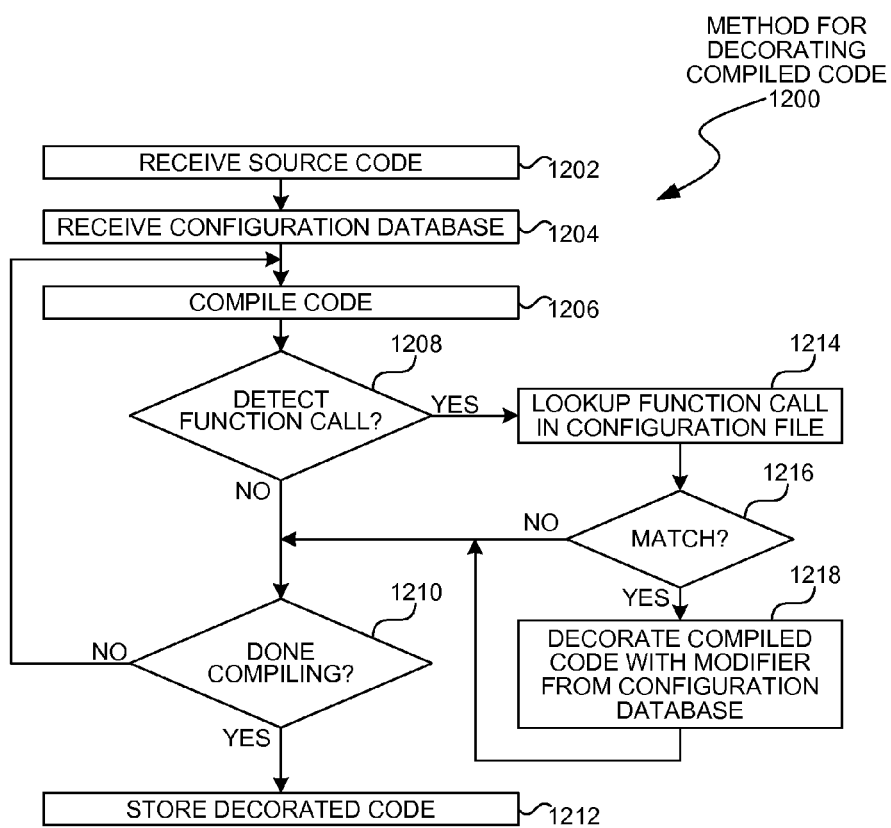
FIG. 12 is a flowchart illustration of an embodiment showing a method for decorating code.

FIG. 12 is a flowchart illustration of an embodiment 1200 showing a method for decorating compiled code. Embodiment 1200 may represent the operations of a compiler, such as compiler 1104 in embodiment 1100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1200 may process source code during compilation to identify function calls and decorate the compiled code with annotations regarding memoization of the function call. The decorations may be hooks or identifiers that may be processed by a runtime environment. In some cases, the decorations may be executable code or parameters that may cause memoization to occur according to a configuration database.

Source code may be received in block 1202. The source code may be human readable source code, intermediate code, or other code that may be compiled.

The configuration database may be received in block 1204.

Compilation may be started in block 1206.

If a function call is not detected in block 1208 and the compiling has not completed, the process loops back to block 1206. When the compiling has completed in block 1210, the decorated compiled code may be stored in block 1212.

When a function call is detected in block 1208, the function call may be looked up in the configuration file in block 1214. When there is no match in block 1216, the process may return to block 1210. When there is a match, the compiled code may be decorated in block 1218.

In some embodiments, the decorations may be executable commands, sequences, or other code that cause the function call to be memoized according to the configuration database. Such embodiments may not perform a look up to the configuration database at runtime. In other embodiments, the decorations may include executable code that performs a look up a configuration database at runtime. In still other embodiments, the decorations may be identifiers that may assist a runtime environment in identifying a function call that may have an entry in the configuration database.

Figure 13:
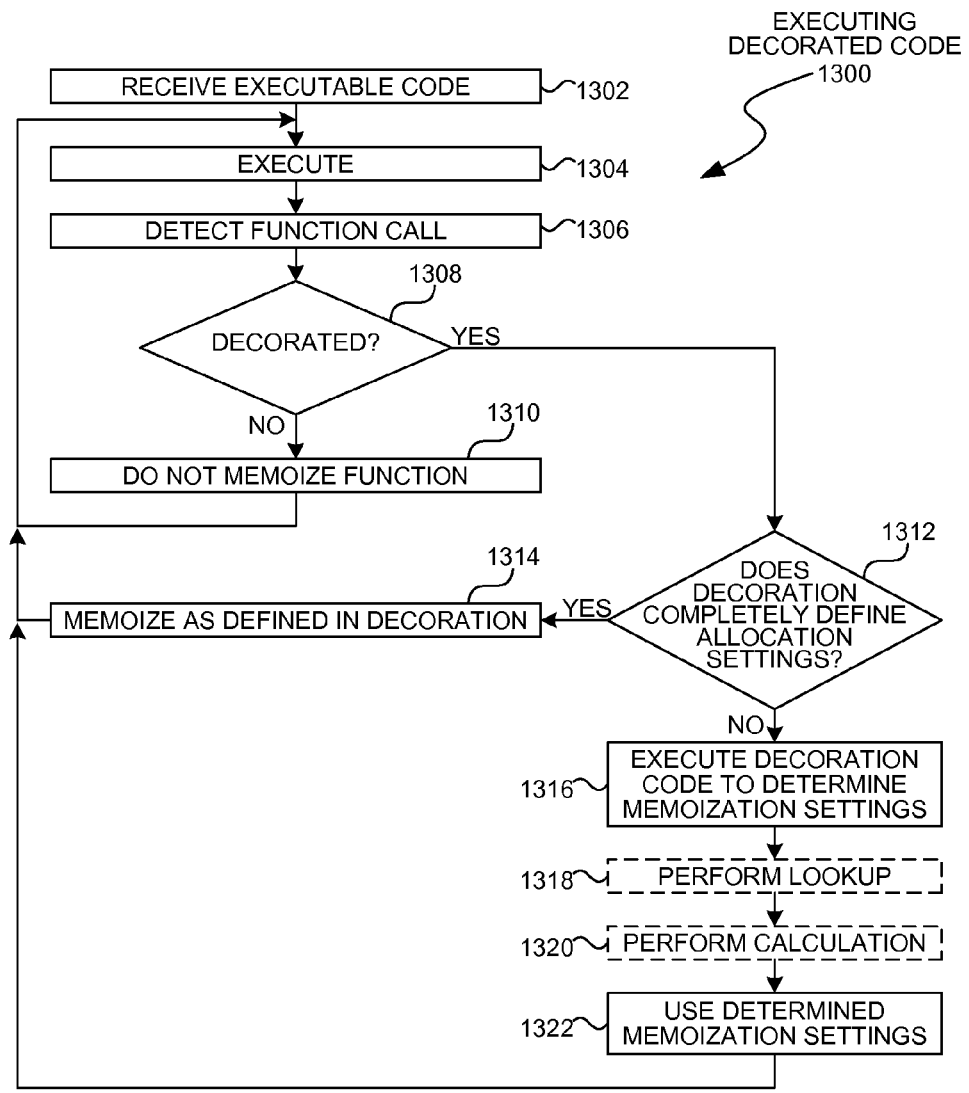
FIG. 13 is a flowchart illustration of an embodiment showing a method for executing decorating code.

FIG. 13 is a flowchart illustration of an embodiment 1300 showing a method for executing decorated code. Embodiment 1300 may illustrate the operations of a client device that executes code that may have been created by the process of embodiment 1100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1300 illustrates a method by which decorated code may be executed. In some cases, the decorated code may be compiled code that may contain decorations or additions to the code at places where memory allocation may occur. In other cases, the decorated code may be interpreted code to which decorations may have been added.

The executable code may be received in block 1302 and may begin executing in block 1304.

During execution, a function call may be detected in block 1306. If the function call is not decorated in block 1308, the function may not be memoized in block 1310 and the process may return to block 1304.

If the function call is decorated in block 1310, the decoration may be evaluated to determine how to memoize the function. In some cases, the decoration may fully define how to memoize the function. For example, the decoration may define that the function may be memoized in certain situations but not in other situations. When the decoration completely defines memoization settings in block 1312, those allocation settings may be used in block 1314.

In other cases, the decoration code may be executed in block 1316 to determine the memoization settings. In some cases, a lookup may be performed in block 1318. In some cases, the decoration code may define a calculation that may be performed in block 1320. In one example of such a calculation, values that may be passed to a memozied function may be evaluated prior to memoization. The newly determined allocation settings may be used in block 1322 to perform the memoization operation.

Figure 14:
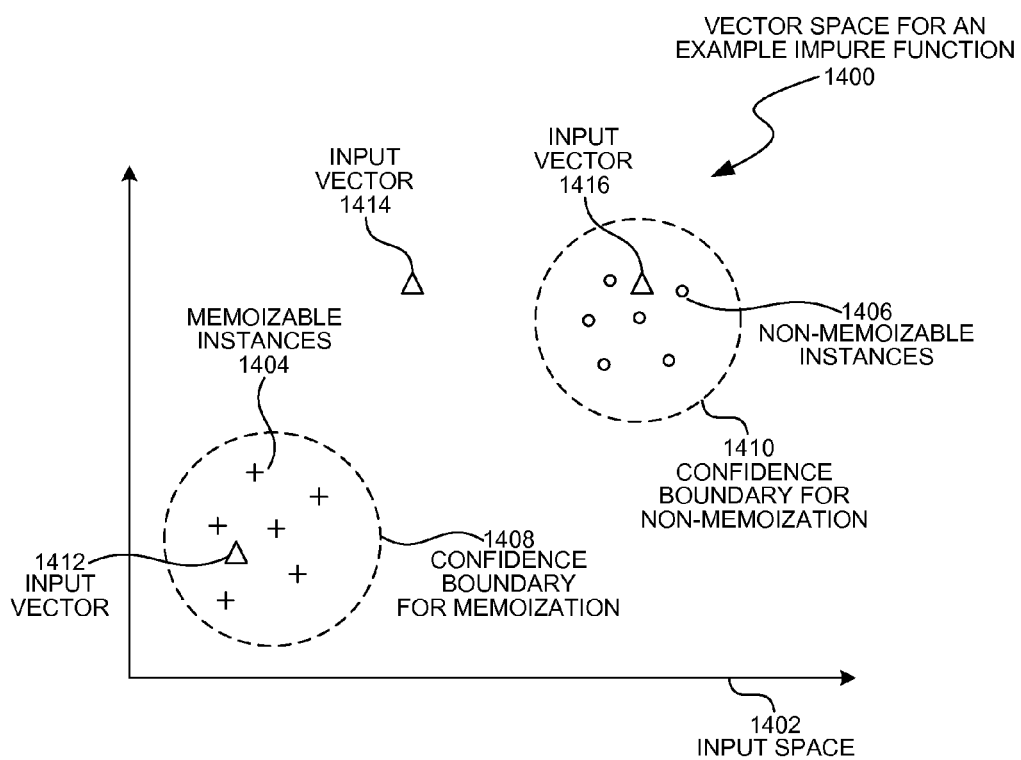
FIG. 14 is a diagram illustration of an embodiment showing a vector space for an impure function.

FIG. 14 is a diagram illustration of an embodiment 1400 showing an input vector space 1402 for an impure function. Embodiment 1400 illustrates an example of a method for determining whether or not a function may be memoizable.

The function being analyzed may be an impure or some other function that may be memoizable in certain conditions but not memoizable in other conditions. The function may be exercised in many different conditions, and each condition may be analyzed to determine whether the function may be memoized in the condition. The results may be plotted in the vector space 1402.

Each input vector may be a set of input values passed to the function. Each value or parameter passed to the function may be one dimension in the input vector space, which may be n-dimensional.

In some cases, different numbers of parameters may be passed to a function when the function may be called. For example, a function may accept an array of any size or a string of characters in different lengths. In such cases, the input vectors for a given function may have different number of factors or numbers of dimensions with different function calls.

Some impure functions may be memoizable in some conditions but not in others. For example, a function may call an impure function with some input values, rendering the function not memoizable. However, the same function may receive a different input vector and may not call the impure function or otherwise may not behave as an impure function. The conditions under which the function may or may not be memoizable may be identified by static analysis or through observations of the function's behavior.

For each condition where the function may have been evaluated, a vector may be stored in the vector space 1402. In some cases, a clustering analysis may be performed to identify groups of memoizable instances 1404 and non-memoizable instances 1406. A further analysis may identify a confidence boundary for memoizable input vectors 1408 and for non-memoizable input vectors 1410.

The confidence boundaries may assist in estimating the memoizability of a function's input vector. For example, the input vector 1412 may be evaluated. Because the input vector 1412 may land within the confidence boundary 1408, the input vector 1412 may be estimated to be memoizable, even though no memoization analysis may be performed. Similarly, input vector 1416 may land within the non-memoizable confidence boundary 1410 and therefore would be assumed to be not memoizable. Input vector 1414 may land outside the confidence boundaries 1408 and 1410. Input vector 1414 may or may not be memoizable, and therefore may be treated as an unknown. Input vector 1414 may then be analyzed to determine whether the vector may be memoizable.

Confidence boundaries may be defined at different degrees of confidence. For example, boundaries may be created for a statistical confidence of 90%, 95%, 99%, 99.9%, or other degrees of confidence.

Figure 15:
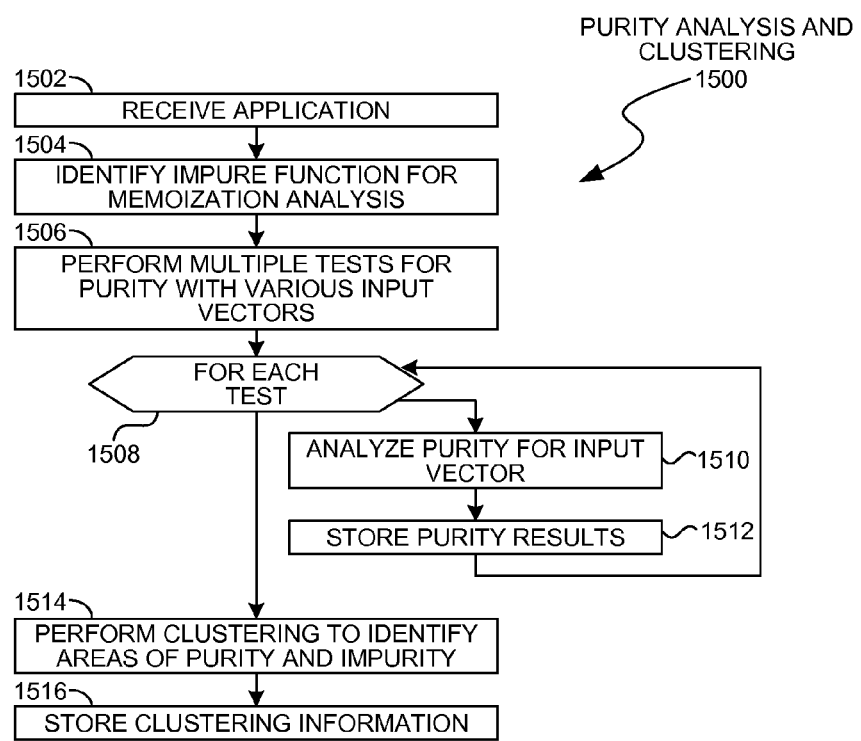
FIG. 15 is a flowchart illustration of an embodiment showing a method for purity analysis and clustering.

FIG. 15 is a flowchart illustration of an embodiment 1500 showing a method for dynamic purity analysis and clustering. Embodiment 1500 may illustrate the operations of a client device that may generate a vector input space and cluster the results.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1500 may be a process that may be performed in an instrumented execution environment to characterize a function as memoizable or not memoizable, then to cluster the results.

An application may be received in block 1502. An impure function may be selected for analysis in block 1504. The impure function may be monitored over multiple input vectors in block 1506. The monitoring may be performed by an instrumented execution environment, which may detect whether or not the impure function produces any detectable side effects.

For each test performed against the function in block 1508, the purity of the function behavior may be determined for a given input vector. The purity may be determined by static or dynamic code analysis. The purity results may be stored in block 1512.

Clustering analysis may be performed after analyzing all of the input vectors in block 1514, and the clustering information may be stored in block 1516.

Figure 16:
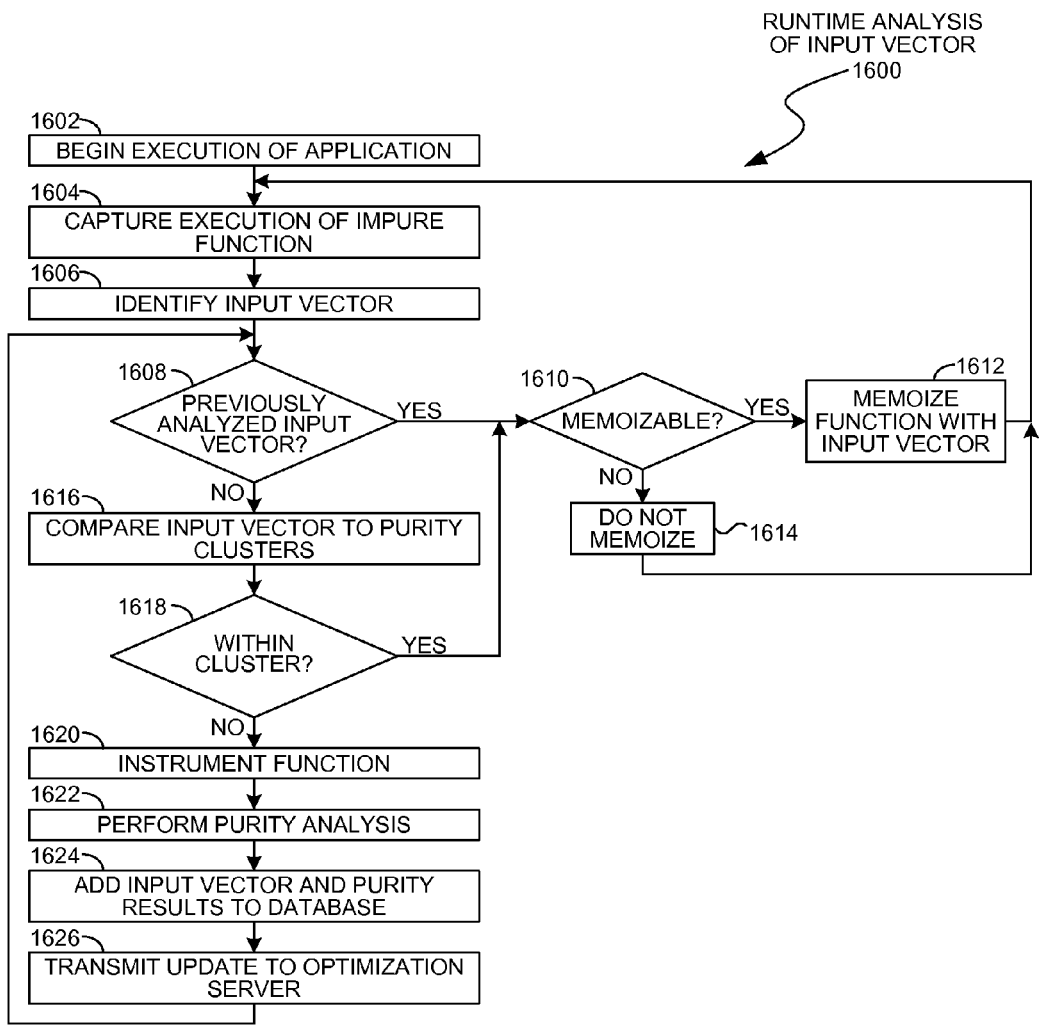
FIG. 16 is a flowchart illustration of an embodiment showing a method for runtime analysis of input vectors.

FIG. 16 is a flowchart illustration of an embodiment 1600 showing a method for runtime analysis of input vectors for a given function. Embodiment 1600 may illustrate the operations of an execution environment for running an application that may have been analyzed using the method of embodiment 1500.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1600 illustrates a method by which an execution environment may determine whether or not an input vector falls within the clusters of known memoizable or non-memoizable input vectors. When a new input vector falls within the clusters, an estimated memoizability may be assumed and acted upon. When the new input vector falls outside the clusters, the new input vector may be analyzed for memoizability.

Application execution may begin in block 1602.

The execution of an impure function may be captured in block 1604 for an input vector identified in block 1606.

When the input vector is a previously analyzed input vector in block 1608, the results of the previous analysis may be used. If the results were that the vector was memoizable in block 1610, the function may be memoized in block 1612. When the results were that the function was not memoizable for the input vector in block 1610, the function may not be memoized for the input vector in block 1614.

When the current input vector has not been analyzed in block 1608, the input vector may be compared to purity clusters in block 1616. When the input vector may fall within a confidence boundary for an input cluster, the input vector may be assumed to belong to the group associated with the boundary and processed in block 1610. Such input vectors may correspond with input vectors 1412 and 1416

When the input vector is not within the clusters in block 1618, the input vector may correspond with input vector 1414. Such an input vector may be instrumented in block 1620 and purity analysis may be performed in block 1622. The purity results and input vector may be added to a local database in block 1624 and an update transmitted to an optimization server in block 1626.

In some cases, a purity determination may be made after exercising a function with the same input vector several times. For example, a function may be monitored during execution to compare results of multiple executions of the function. When the results are consistent, the function may be considered predictable and therefore potentially memoizable. The function may be also analyzed for side effects to determine whether or not the function is actually memoizable.

The analysis of embodiment 1600 may be useful in situations where one or more input parameters to a function may be continuous variables. In some cases, an input parameter may be a categorized parameter that may have a discrete number of options. In such cases, each and every number of options may be exercised to completely define an input space. In other cases, a continuous parameter may be such that all of the options for the parameter cannot be exhaustively tested. Examples of continuous input parameters may be numerical values as real or integer numbers, text strings, or other variables.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by at least one processor, said method comprising:
   receiving operational results for an application comprising a first function, said operational results comprising inputs to said first function, results returned from said first function, and a state associated with said inputs to said first function;
   said operational results being collected by a tracer;
   determining that a first side effect comprises reading a first memory object, said state comprising values for said first memory object;
   determining that said first side effect does not comprise mutating said first memory object;
   determining that said first function returns a first value given a first condition, said first condition comprising a first set of input parameter values and a first value for said first memory object;
   causing said first function to be memoized under said first condition without collecting said operational results by said tracer.

2. The method of claim 1 further comprising:
   analyzing said operational results and determining that said first function under said first condition returns a consistent result.

3. The method of claim 2, said consistent result being determined within a statistical certainty.

4. The method of claim 2, said plurality of operational results being captured during executing an application comprising said first function.

5. The method of claim 4, said application being executed under simulated loads.

6. The method of claim 4, said application being executed under actual loads.

7. The method of claim 4 further comprising:
   determining that said first function returns a second value under a second condition, said second condition comprising said first set of input parameter values and a second value for said first memory object; and
   causing said first function to be memoized under said second condition.

8. The method of claim 7 further comprising:
   determining that said first function returns inconsistent values under a third condition, said third condition comprising said first set of input parameter values and a third value for said first memory object; and
   causing said first function not to be memoized under said third condition.

9. The method of claim 8 further comprising:
   receiving said operational results from a client device.

10. The method of claim 9 further comprising:
    storing a record in a configuration database for memoizing said first function.

11. The method of claim 10, said record indicating that said first function is memoizable under said first condition.

12. The method of claim 11, said record indicating that said first function is not memoizable under said third condition.

13. A system comprising:
    a processor;
    a purity analyzer operating on said processor, said purity analyzer that:
       receives operational results for an application comprising a first function, said operational results comprising inputs to said first function, results returned from said first function, and a state associated with said inputs to said first function;
       said operational results being collected by a tracer;
       determines that a first side effect comprises reading a first memory object, said state comprising values for said first memory object;
       determines that said first side effect does not comprise mutating said first memory object;
       determines that said first function returns a first value given a first condition, said first condition comprising a first set of input parameter values and a first value for said first memory object;
       stores said first function and said first condition in a configuration database, said configuration database being used to execute said application without said tracer to memoize said first function.

14. The system of claim 13 further comprising:
    a distribution server that transmits said configuration database to a client device.

15. The system of claim 14 further comprising:
    an instrumented execution environment that executes an application comprising said first function and generates said operational results.

16. The system of claim 15, said instrumented execution environment that further executes said application under simulated loads.

17. The system of claim 16, said purity analyzer that further:
    determines that said first function returns inconsistent values under a second condition, said second condition comprising said first set of input parameter values and a second value for said first memory object; and
    stores said first function and second condition in said configuration database as being not memoizable.

18. The system of claim 17 further comprising:
    a static code analyzer that examines said application to identify said first function as impure.

19. The system of claim 18, said static code analyzer that analyzes said application in source code form.

* * * * *